United States Patent [19]
Zhao et al.

[11] Patent Number: 5,303,586
[45] Date of Patent: Apr. 19, 1994

[54] PRESSURE OR FLUID LEVEL SENSOR

[75] Inventors: Yang Zhao, Novi; Qingfeng Tang, Detroit, both of Mich.

[73] Assignee: Wayne State University, Detroit, Mich.

[21] Appl. No.: 7,672

[22] Filed: Jan. 22, 1993

[51] Int. Cl.⁵ .................. G01B 11/00; G01F 23/00
[52] U.S. Cl. ..................... 73/293; 250/900; 250/904
[58] Field of Search ............ 73/293, 299, 302; 250/577, 900, 904, 907

[56] References Cited

U.S. PATENT DOCUMENTS

| | | | |
|---|---|---|---|
| 2,984,148 | 5/1961 | Vollmer | 250/904 X |
| 4,069,838 | 1/1978 | Hansel et al. | 137/392 |
| 4,287,427 | 9/1981 | Scifres | 250/577 |
| 4,320,394 | 3/1982 | John, Jr. | 340/618 |
| 4,836,632 | 6/1989 | Bardoorian | 350/96.2 |
| 4,880,971 | 11/1989 | Danisch | 250/227 |
| 4,979,797 | 12/1990 | Nemeth | 350/96.29 |
| 4,994,682 | 2/1991 | Woodside | 250/577 |
| 5,072,617 | 12/1991 | Weiss | 73/299 |

FOREIGN PATENT DOCUMENTS

| | | | |
|---|---|---|---|
| 0291150 | 5/1928 | United Kingdom | 73/302 |
| 2173894 | 10/1986 | United Kingdom | 250/904 |

OTHER PUBLICATIONS

A. Arie et al., "Measurerment and Analysis ... Applications to Sensors", Applied Optics, vol. 25, No. 11, Jun. 1986, pp. 1754–1758.

*Primary Examiner*—William A. Cuchlinski, Jr.
*Assistant Examiner*—W. Morris Worth
*Attorney, Agent, or Firm*—Barnes, Kisselle, Raisch, Choate, Whittemore & Hulbert

[57] ABSTRACT

A moveable body, cladding medium, and fiber are arranged to form a sensor suitable for use in monitoring changes in liquid, fluid, and material level and changes in pressure. The moveable body moves in response to changes in pressure or force. Movement of the body causes a change in the length of cladding medium surrounding an optical fiber. As the extent of cladded fiber length changes, the intensity of light transmitted through the fiber also changes.

11 Claims, 2 Drawing Sheets

PRESSURE OR FLUID LEVEL SENSOR

FIELD OF THE INVENTION

This invention relates to a pressure or material level sensor and, in one particular aspect, to a fluid level sensor that uses fiber optic components.

BACKGROUND OF THE INVENTION

The detection of liquid or fluid level is one of many functions for which fiber-optic sensors are more suitable than their electrical counterparts, especially in noisy or hostile environments. Current sensors are typically arranged as simple on-off level switches which sense a sudden increase in optical radiation loss from an uncladded optical fiber making contact with a material liquid or fluid. An array of such "point" sensors may be used to detect a number of discrete levels; however, such a system is complex and provides discontinuous indication of level.

U.S. Pat. No. 5,072,617 shows a sensor configuration where a diaphragm is deflected by pressure of a liquid. Light is reflected off of one face of the diaphragm, and the reflected light is transmitted through several additional fibers. This is a relatively complicated arrangement.

Various other sensors are known in the art for measuring liquid level, but their use may be limited if: 1) they require fibers or other optical components to be immersed in the liquid, which immersion could modify the optical characteristics of the fiber as a result of "wetting" or corrosion; 2) they require light to pass through a liquid whose refractive or absorptive properties effect the operation of the sensor, thereby limiting their operation with certain liquids, especially opaque ones; or 3) they are complex and rely on components which are not common in the fiber-optics industry. What is needed is a level sensor which is simple, uses available components, and is relatively economical for commercial use.

SUMMARY OF THE INVENTION

It is desirable to have a sensor which can essentially continuously detect a change in pressure or level of a material or fluid, and which is simple and can be constructed from existing components.

Accordingly, it is an object of the invention to provide a sensor which continuously measures changes in pressure or fluid level using an apparatus which does not rely on the optical properties of the fluid being measured, and does not require any optical fiber tubing to contact the fluid. It is also an object of the invention to measure fluid level by detecting the hydrostatic pressure produced by a column of fluid or material. To achieve these and other objects and advantages in a preferred embodiment, a fluid level indicator system is provided which utilizes fiber optics to sense a change in fluid level.

In one embodiment, the invention comprises a body having first and second opposed major surfaces. The first surface is constructed and arranged to respond to force exerted by a material or fluid in a container adjacent the first surface. A reservoir containing an optical fiber and cladding medium surrounding the fiber is open to the second major surface of the body. The body and reservoir are constructed and arranged so that as the force exerted by a material or fluid at the first surface changes, the change is transmitted from the first surface of the body to the second surface, whereby the second surface of the body moves so as to cause the level of cladding medium surrounding the fiber to change. When the level of cladding medium surrounding the fiber changes, the transmission of light through the fiber is modulated and sensed by a detecting means. The detecting means preferably senses a change in the intensity of the light and converts it to a corresponding signal such as a change in watts or electric power.

Advantageously, any number of currently available light sources may be used to transmit light through the fiber with infrared and visible light being preferred. In a preferred embodiment, the body is in the form of a piston slidably received in a barrel, with one end of the piston (first end) operably connected to means responsive to force exerted by a material or fluid in a container adjacent the first end of the barrel. The reservoir containing the cladding medium is open to the second end of the barrel and contains an optical fiber surrounding the cladding medium. The piston, reservoir, and barrel are constructed and arranged so as to permit the piston to be urged toward the second end (reservoir end) of the barrel as force exerted by the fluid or material in the container increases. The piston is urged toward the first end (container end) of the barrel as the force of the material in the container decreases. Movement of the piston causes the amount or level of cladding medium in a reservoir to change thereby causing the level of cladding medium surrounding the fiber to change. This modulates the transmission of light through the fiber. Thus, as the length of cladding surrounding the fiber changes, the intensity of light emitted from the fiber also changes.

Optical fiber material suitable for use with the invention is of silica or plastic and basically comprises a solid, cylindrical elongated structure.

Preferably, the reservoir in which the optical fiber is contained is generally cylindrical and has a diameter on the order of 10 to 100 times greater than the diameter of the fiber, providing a column of cladding medium of thickness greater than the fiber. Preferably, the cladding medium has a high surface tension on the order of about 0.4 newtons per meter and does not adhere to the fiber nor leave a residue of cladding medium on the exterior of the optical fiber as the level of the medium changes. Preferably, the cladding material also has a high viscosity. Suitable cladding medium include, but are not limited to, mercury and alcohol. Besides pistons, suitable bodies are in the form of flexible diaphragms.

These and other objects, features and advantages will become apparent from the following description of the preferred embodiments, appended claims and accompanying drawings.

BRIEF DESCRIpTION OF THE DRAWINGS

FIG. 1 shows a sensor with a single fiber.

FIGS. 2 and 3 show a single fiber with two or more legs formed by bending the fiber, and the cladding medium (flowable material) moving in a direction generally parallel to the legs.

FIG. 4 shows a single fiber with multiple bends arranged so that multiple legs of fibers are at an angle to the direction of movement of cladding medium.

FIG. 5 shows a sensor with two fibers.

DETAILED DESCRIPTION OF THE PREFERRED EMBODIMENTS

Figure 1:
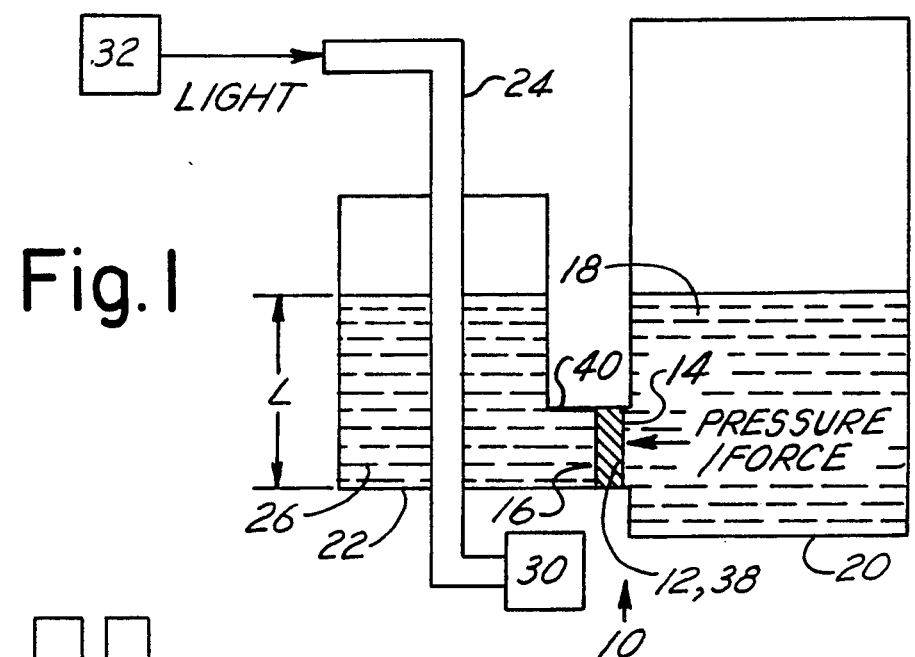
FIGS. 1 through 5 are diagrammatic cross-sectional views of pressure and level sensors of the invention.

As shown in FIG. 1, a pressure or level sensor 10 has a body 12 with first and second opposed major surfaces 14,16. The first surface 14 is constructed and arranged to respond to force exerted by a material or fluid 18 in a container 20 adjacent the first surface 14. A reservoir 22 containing an optical fiber 24 and cladding medium 26 surrounding the fiber is open to the second major surface 16 of the body 12. The body 12 and reservoir 22 are constructed and arranged so that as the force exerted by a material or fluid 18 at the first surface 14 changes, the change is transmitted from the first surface 14 of the body 12 to the second surface 16, whereby the second surface 16 of the body 12 either moves or is flexed so as to cause the level (L) of cladding medium 26 surrounding the fiber 24 to change. When the level of cladding medium 26 surrounding the fiber 24 changes, the transmission of light through the fiber is modulated and sensed by indicating means 30. The indicating means 30 is preferably a light detecting means which senses a change in the intensity of the light produced by source 32 and converts it to a corresponding signal such as a change in watts per second or electric power.

The basic arrangement of FIG. 1 could be used with one or more fibers 24. If desired, the fiber 24 could be bent or looped in any direction. Since the intensity of detected light depends on the level of cladding medium 26 and the length of fiber 24, measurement sensitivity may be increased by exposing a greater length of fiber 24 to changing level of cladding medium 26.

Figure 2:
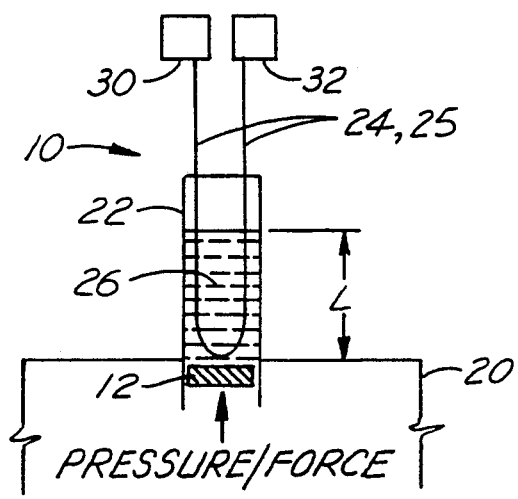
Figure 3:
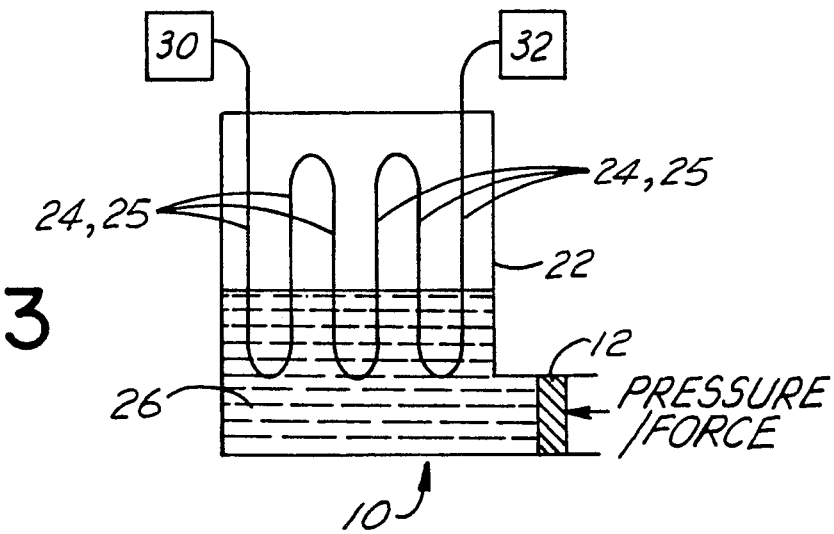
Figure 4:
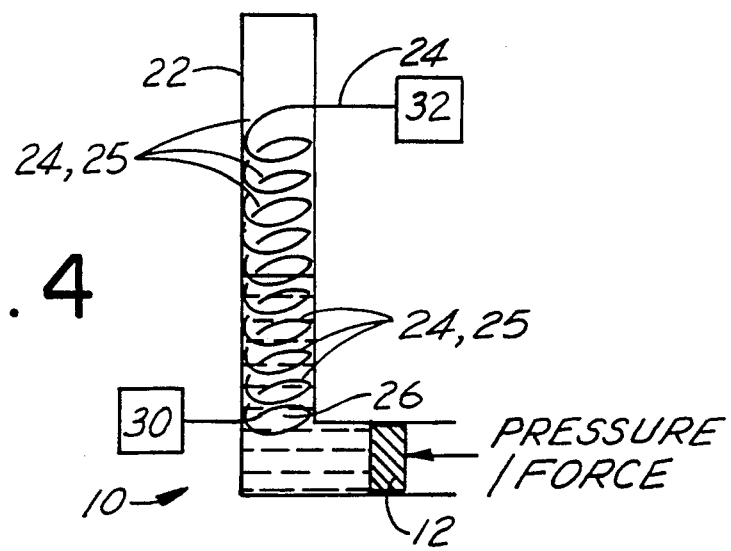
Figure 5:
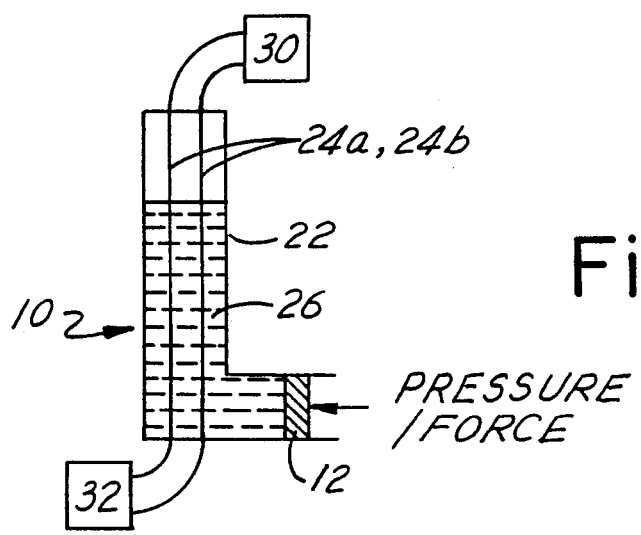

An example of a bent fiber 24 (loop) is shown in FIG. 2, where like parts carry numbers as per FIG. 1. As can be seen in FIG. 2, the looped fiber 24 has a greater length of fiber 24 (two legs 25) exposed to changes in cladding medium 26 level. Of course, multiple loops may be used as shown in FIGS. 3 and 4 to increase sensitivity. More than one fiber 24a, 24b may also be used, as shown in FIG. 5.

The body 12 is in the form of a flexible diaphragm or a piston. A diaphragm flexes in response to force or pressure in the direction of the arrows shown in the figures. A piston moves in response to force or pressure changes as explained in Example 1.

For fluid level measurement, this pressure sensor is placed in a suitable location at or near the bottom of a fluid container 20 (FIG. 1). The pressure on the body depends on the level of the fluid in container 20 and the fluid density. The fluid level can be determined from the change in intensity of light caused by the change in level (L) of cladding medium 26 surrounding the fiber 24.

Example 1

In this example, a sensor 10 was assembled as shown in FIG. 1 with a body 12 in the form of a piston 38 slidably received in a barrel 40, with one end of the piston (first end) operably connected to means responsive to force exerted by a material or fluid in a container 20 adjacent the first end of the barrel 40. The reservoir 22 containing the cladding medium 26 was open to the second end of the barrel 40 and contained an optical fiber 24 surrounded by the cladding medium 26. The piston 38, reservoir 22, and barrel 40 were constructed and arranged so as to permit the piston 38 to be urged toward the second end (reservoir end) of the barrel 40 as force exerted on the piston increased. The piston 38 was urged toward the other end of the barrel 40 as the force on the piston decreased. The optical fiber used was glass about 300 microns in diameter. The cladding medium was mercury.

In response to movement of the piston 38 the amount of cladding medium 26 in the cladding reservoir 22 changed and this caused the level (L) of cladding medium 26 surrounding the fiber 24 to change, thus modulating transmission of light through the fiber 24.

Figure 6:
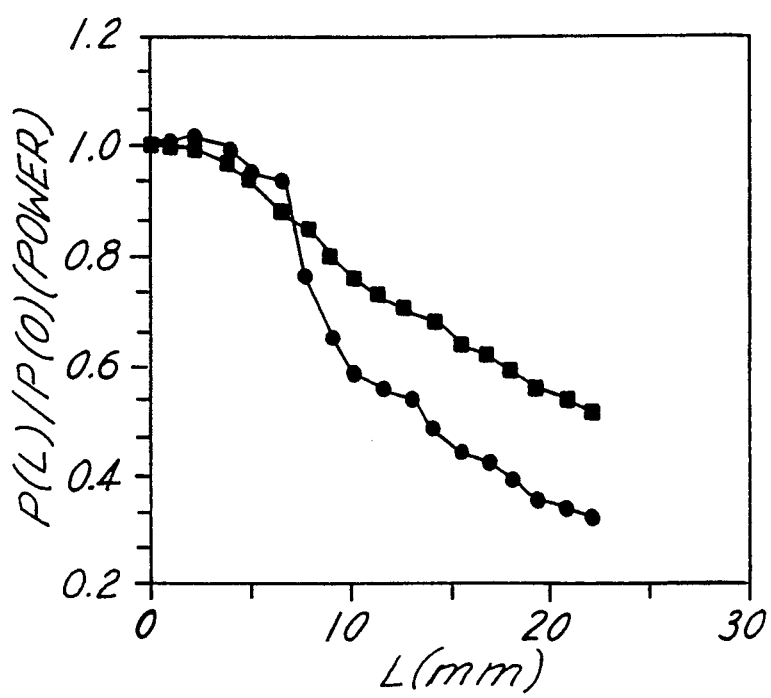
FIG. 6 is a plot of power of light sensed as a function of length of fiber surrounded by cladding medium.

The sensor was calibrated and tested to demonstrate performance of the cladding-length dependant sensor. The results (FIG. 6) show normalized output power P(L)/P(O) versus modified cladding length (L) for two different angles of incident light, one at 0.0413°, and another at 3.81°, where Po is the initial condition representing essentially no cladding material surrounding the fiber. The results show that the output light power is linear and sensitive to the change of lossy cladding length (about 0.1 dB/1 mm). Therefore, the resolution of the sensors can be very high. Further discussion of the variation of light transmission as a function of modified cladding light transmission and length, can be found in an article entitled "*Measurement And Analysis Of Light Transmission Through A Modified Cladding Optical Fiber With Applications To Sensors*", by authors Ady Arie, Reuven Karoubi, Yigal S. Gur, and Moshe Tur, published in Applied Optics, Volume 25, No. 11, Jun. 1, 1986.

A suitable optic fiber 24 of plastic or glass (silica) is available from Mitsubishi or Corning Glass and has a diameter on the order of 300 microns, although essentially any diameter is suitable. Optical fibers of glass or plastic share common characteristics such as being thin and flexible, immunity to electromagnetic interference and being able to transmit light throughout their length by internal reflections. Good results are obtained when the cladding medium surrounding the fiber has a thickness greater than the thickness of the fiber. The cladding medium is also referred to as a "flowable material". Preferably, the minimum cladding medium thickness is about ten times the diameter of the fiber. A suitable cladding medium is mercury. Alcohols and other flowable materials may also be used. Preferably, the cladding medium has a high surface tension on the order of about 0.4 newtons per meter and does not adhere to the fiber nor leave a residue of cladding medium on the exterior of the optical fiber as the level of the medium changes. Preferably, the cladding material also has a high viscosity. Different cladding media produce different intensity changes, so the system needs to be calibrated to the medium selected. It should be noted that a cladding medium which leaves a residue on the fiber will produce relatively less accurate results. It should also be noted that the orientation of the bends in the fiber will determine whether the output is a discrete or continuous measure of level changes. For example, a fiber coil with loops (legs) lying in a plane perpendicular to the direction of cladding medium movement would tend to give discrete results. That is, intensity changes which vary step-wise as the cladding medium moves from coil loop to coil loop. Coil loops having legs essentially parallel to cladding medium movement (FIGS. 2 and 3), tend to give more accurate and continuous intensity changes in response to cladding medium movement, and to changes in force/pressure.

The reservoir 22 in which the cladding medium and optical fiber are contained may be a closed vessel, and as the level of the cladding medium within the reservoir increases, air within the reservoir becomes compressed. Alternatively, the reservoir may be evacuated (i.e. vacuum inside the reservoir). This is not critical. The system merely needs to be calibrated so that a change in the length of cladded fiber is directly correlated to a change in the force exerted by the material or fluid being moni7 tored.

Optical fiber sensors, in general, offer significant advantages over conventional electronic sensors, such as immunity from electromagnetic interference, electrically passive operation, large dynamic range, high sensitivity, and very small size. We have used the advantages of optical fibers to produce a pressure and continuous fluid level sensor. The advantages of the sensor include high accuracy and resolution; low cost; high reliability and good durability; good vibration and fatigue resistance; compact size; and adaptability for distributed sensors.

While this invention has been described in terms of certain embodiments thereof, it is not intended that it be limited to the above description, but rather only to the extent set forth in the following claims.

The embodiments of the invention in which an exclusive property or privilege is claimed are defined in the appended claims.

We claim:

1. A sensor, adaptable for use in monitoring the level of fluid or material in a container, comprising:
   a) a barrel having spaced apart first and second ends and a piston slidably received in said barrel;
   b) said piston having one end facing said first end of said barrel and responsive to force exerted thereon by a material or fluid in a container in communication with said barrel and adjacent said first end of said barrel;
   c) a reservoir open to said second end of said barrel and containing an optical fiber and a cladding medium surrounding said fiber; said piston serving as a free floating barrier separating the material or fluid in the container and said cladding medium in the reservoir, said piston, reservoir and barrel constructed and arranged so as to permit said piston to be urged toward said second end of said barrel as the force exerted by the fluid or material in the container increases, and to be urged toward said first end of said barrel as the force decreases, whereby in response to movement of said piston, the amount of said cladding medium in said reservoir changes, causing the level of said cladding medium surrounding said fiber to change; and
   d) a light source at one end of said optical fiber and indicating means for sensing optical transmission through said fiber; said fiber, light source, and indicating means constructed and arranged so that changes in the level of said cladding medium modulate the transmission of light through said fiber as sensed by said indicating means.

2. The sensor according to claim 1, wherein said cladding medium is mercury or alcohol.

3. The sensor according to claim 1, wherein said optical fiber is of glass or plastic.

4. The sensor according to claim 1, wherein said optical fiber is coiled within said reservoir.

5. A sensor, adaptable for use in monitoring the level of fluid or material in a container, comprising:
   a) a body in the form of free floating piston having first and second opposed major surfaces, said body constructed and arranged to respond to force exerted by a material of fluid in said container at said first surface;
   b) a reservoir containing an optical fiber and cladding medium surrounding said optical fiber, said reservoir open to said second major surface of said body; said body serving as a free floating barrier separating the material or fluid in the container from said cladding medium in said reservoir and being responsive and subject only to forces exerted by the material or fluid in the container and said cladding medium in said reservoir;
   c) said body and reservoir constructed and arranged so that as the force exerted on said first surface changes, said body moves so as to cause the level of said cladding medium surrounding said fiber to change; and
   d) a light source at one end of said fiber and indicating means for sensing optical transmission through said fiber; said fiber, light source, and indicating means constructed and arranged so that changes in the level of said cladding medium modulate the transmission of light through said fiber as sensed by said indicating means.

6. The sensor according to claim 5, wherein said cladding medium is mercury or alcohol.

7. The sensor according to claim 5, wherein said optical fiber is of glass or plastic.

8. The sensor according to claim 5, wherein said optical fiber is coiled within said reservoir.

9. A sensor, adaptable for use in monitoring the level of fluid or material in a container, comprising:
   a) a body in the form of a free floating piston having first and second opposed major surfaces, said piston constructed and arranged to respond to force exerted by a material or fluid at said first surface;
   b) a reservoir containing at least two or more optical fibers and cladding medium surrounding each one of said optical fibers, said reservoir open to said second major surface of said body; said body serving as a free floating barrier separating the material or fluid in the container from said cladding medium in said reservoir and being responsive and subject only to forces exerted by the material or fluid in the container and said cladding medium in said reservoir;
   c) said body and reservoir constructed and arranged so that as the force exerted on said first surface changes, said body moves so as to cause the level of said cladding medium surrounding each one of said optical fibers to change; and
   d) a light source at one end of each one of said optical fibers and indicating means for sending optical transmission; each one of said optical fibers, light source, and indicating means constructed and arranged so that changes in the level of said cladding medium modulate the transmission of light through each one of said optical fibers as sensed by said indicating means.

10. The sensor according to claim 9, wherein the cladding medium is mercury or alcohol.

11. The sensor according to claim 9, wherein each one of said fibers is of glass or plastic.

* * * * *